US007359558B2

(12) United States Patent
Klein Gunnewiek et al.

(10) Patent No.: US 7,359,558 B2
(45) Date of Patent: *Apr. 15, 2008

(54) SPATIAL SCALABLE COMPRESSION

(75) Inventors: Reinier Bernardus Maria Klein Gunnewiek, Eindhoven (NL); Wilhelmus Hendrikus Alfonsus Bruls, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 682 days.

This patent is subject to a terminal disclaimer.

(21) Appl. No.: 10/493,266

(22) PCT Filed: Oct. 21, 2002

(86) PCT No.: PCT/IB02/04389

§ 371 (c)(1),
(2), (4) Date: Apr. 21, 2004

(87) PCT Pub. No.: WO03/036983

PCT Pub. Date: May 1, 2003

(65) Prior Publication Data
US 2004/0252901 A1 Dec. 16, 2004

(30) Foreign Application Priority Data
Oct. 26, 2001 (EP) .................................. 01204066
Mar. 8, 2002 (EP) .................................. 02075916

(51) Int. Cl.
*G06K 9/36* (2006.01)

(52) U.S. Cl. ...................... 382/236; 382/232; 382/233; 382/254

(58) Field of Classification Search ................ 382/236, 382/232, 233, 261, 254, 238, 234; 375/240.12, 375/240.21, E7.09, E7.105; 348/E5.108, 348/E5.11, E5.111, E7.015
See application file for complete search history.

(56) References Cited

U.S. PATENT DOCUMENTS 6,728,317 B1 * 4/2004 Demos .................. 375/240.21

OTHER PUBLICATIONS

Radha et al., "The MPEG-4 Fine-Grained Scalable Video Coding Method for Multimedia Streaming Over IP", IEEE, vol. 3, No. 1, Mar. 2001, pp. 53-68.*

* cited by examiner

Primary Examiner—Anh Hong Do

(57) ABSTRACT

A method and apparatus for providing spatial scalable compression using adaptive content filtering of a video stream is disclosed. The video stream is downsampled to reduce the resolution of the video stream. The downsampled video stream is encoded to produce a base stream. The base stream is decoded and upconverted to produce a reconstructed video stream. The reconstructed video stream is subtracted from the video stream to produce a residual stream. The resulting residual stream is encoded in an enhancement encoder and outputs an enhancement stream. The residual signal in selected frames is muted in the enhancement encoder while the motion information in the frame is maintained.

19 Claims, 6 Drawing Sheets

SPATIAL SCALABLE COMPRESSION

FIELD OF THE INVENTION

The invention relates to spatial scalable compression schemes.

BACKGROUND OF THE INVENTION

Because of the massive amounts of data inherent in digital video, the transmission of full-motion, high-definition digital video signals is a significant problem in the development of high-definition television. More particularly, each digital image frame is a still image formed from an array of pixels according to the display resolution of a particular system. As a result, the amounts of raw digital information included in high resolution video sequences are massive. In order to reduce the amount of data that must be sent, compression schemes are used to compress the data. Various video compression standards or processes have been established, including, MPEG-1, MPEG-2, MPEG-4, H.263, and H264.

Many applications are enabled where video is available at various resolutions and/or qualities in one stream. Methods to accomplish this are loosely referred to as scalability techniques. There are three axes on which one can deploy scalability. The first is scalability on the time axis, often referred to as temporal scalability. Secondly, there is scalability on the quality axis, often referred to as signal-to-noise scalability or fine-grain scalability. The third axis is the resolution axis (number of pixels in image) often referred to as spatial scalability or layered coding. In layered coding, the bitstream is divided into two or more bitstreams, or layers. Each layer can be combined to form a single high quality signal. For example, the base layer may provide a lower quality video signal, while the enhancement layer provides additional information that can enhance the base layer image.

In particular, spatial scalability can provide compatibility between different video standards or decoder capabilities. With spatial scalability, the base layer video may have a lower resolution than the input video sequence, in which case the enhancement layer carries information which can restore the resolution of the base layer to the input sequence level.

Most video compression standards support spatial scalability. FIG. 1 illustrates a block diagram of an encoder 100 which supports MPEG-2/MPEG-4 spatial scalability. The encoder 100 comprises a base encoder 112 and an enhancement encoder 114. The base encoder is comprised of a low pass filter and downsampler 120, a motion estimator 122, a motion compensator 124, an orthogonal transform (e.g., Discrete Cosine Transform (DCT)) circuit 130, a quantizer 132, a variable length coder 134, a bitrate control circuit 135, an inverse quantizer 138, an inverse transform circuit 140, switches 128, 144, and an interpolate and upsample circuit 150. The enhancement encoder 114 comprises a motion estimator 154, a motion compensator 155, a selector 156, an orthogonal transform (e.g., Discrete Cosine Transform (DCT)) circuit 158, a quantizer 160, a variable length coder 162, a bitrate control circuit 164, an inverse quantizer 166, an inverse transform circuit 168, switches 170 and 172. The operations of the individual components are well known in the art and will not be described in detail.

Unfortunately, the coding efficiency of this layered coding scheme is not very good. Indeed, for a given picture quality, the bitrate of the base layer and the enhancement layer together for a sequence is greater than the bitrate of the same sequence coded at once.

FIG. 2 illustrates another known encoder 200 proposed by DemoGrafx. The encoder is comprised of substantially the same components as the encoder 100 and the operation of each is substantially the same so the individual components will not be described. In this configuration, the residue difference between the input block and the upsampled output from the upsampler 150 is inputted into a motion estimator 154. To guide/help the motion estimation of the enhancement encoder, the scaled motion vectors from the base layer are used in the motion estimator 154 as indicated by the dashed line in FIG. 2. However, this arrangement does not significantly overcome the problems of the arrangement illustrated in FIG. 1.

While spatial scalability, as illustrated in FIGS. 1 and 2, is supported by the video compression standards, spatial scalability is not often used due to a lack of coding efficiency. The lack of efficient coding means that, for a given picture quality, the bit rate of the base layer and the enhancement layer for a sequence together are more than the bit rate of the same sequence coded at once.

SUMMARY OF THE INVENTION

It is an object of the invention to overcome the above-described deficiencies of the known spatial scalability schemes by providing more efficient spatial scalable compression schemes by slightly reducing the picture quality in every other picture frame.

According to one embodiment of the invention, a method and apparatus for providing spatial scalable compression using adaptive content filtering of a video stream is disclosed. The video stream is downsampled to reduce the resolution of the video stream. The downsampled video stream is encoded to produce a base stream. The base stream is decoded and upconverted to produce a reconstructed video stream. The reconstructed video stream is subtracted from the video stream to produce a residual stream. The resulting residual stream is encoded in an enhancement encoder and outputs an enhancement stream. Information in selected frames is muted in the enhancement encoder.

According to another embodiment of the invention, a method and apparatus for decoding compressed video information received in a base stream and an enhancement stream is disclosed. The base stream is decoded and then upconverted to increase the resolution of the decoded base stream. The encoded frames are decoded in the enhancement stream to create a first decoded enhancement stream. The upconverted decoded base stream is combined with the enhancement stream to produce a video output. In addition, a second decoded enhancement stream is generated for empty frames in the received enhancement stream using a temporal interpolation algorithm. The first and second decoded enhancement streams are interleaved to create an interleaved enhancement stream.

These and other aspects of the invention will be apparent from and elucidated with reference to the embodiments described hereafter.

BRIEF DESCRIPTION OF THE DRAWINGS

The invention will now be described, by way of example, with reference to the accompanying drawings, wherein.

DETAILED DESCRIPTION OF THE INVENTION

According to one embodiment of the invention, at least some frame information is muted in the enhancement encoder. For example, motion vectors are encoded instead B-frames. Since B-frames are not used for consecutive predictions, these frames can easily be left out. However, the result of leaving these frames out is an unacceptable loss in picture quality due to the fact that one can clearly see the change in resolution and sharpness in every other frame. These problems can be overcome by coding the motion vectors instead of the complete B-frame on the enhancement layer as will be described below. By inserting empty B-frames into the enhancement encoder, a reduction in the size of the enhancement layer can be obtained.

Figure 3:
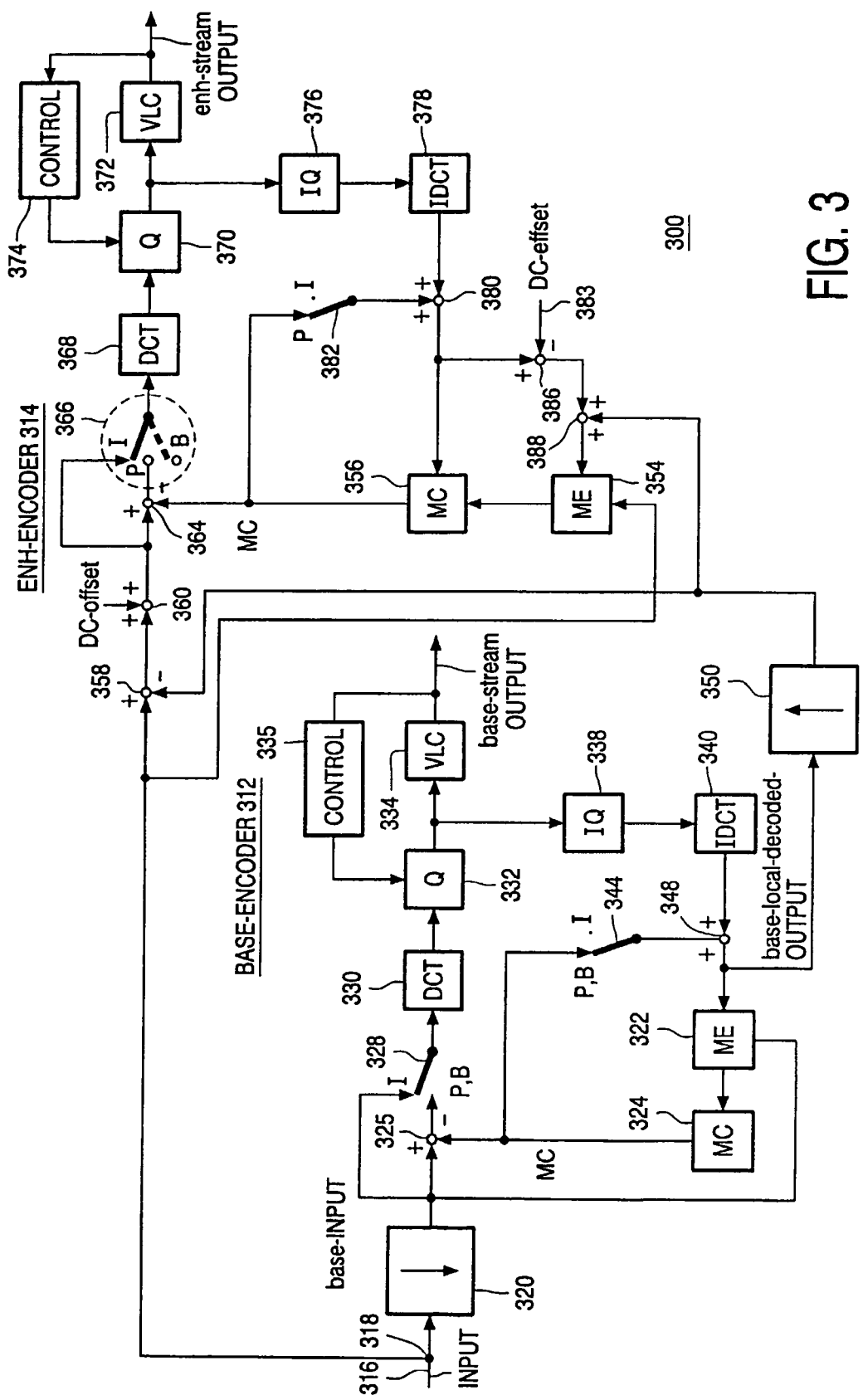
FIG. 3 is a block schematic representation of an encoder with spatial scalability according to one embodiment of the invention.

FIG. 3 is a schematic diagram of an encoder according to one embodiment of the invention. It will be understood that this is an illustrative example of an encoder which can be used to implement the invention, and other encoders can also be used to implement the invention. The depicted encoding system 300 accomplishes layered compression, whereby a portion of the channel is used for providing a low resolution base layer and the remaining portion is used for transmitting enhancement information, whereby the two signals may be recombined to bring the system up to high resolution.

The encoder 300 comprises a base encoder 312 and an enhancement encoder 314. The base encoder is comprised of a low pass filter and downsampler 320, a motion estimator 322, a motion compensator 324, an orthogonal transform (e.g., Discrete Cosine Transform (DCT)) circuit 330, a quantizer 332, a variable length coder (VLC) 334, a bitrate control circuit 335, an inverse quantizer 338, an inverse transform circuit 340, switches 328, 344, and an interpolate and upsample circuit 350.

An input video block 316 is split by a splitter 318 and sent to both the base encoder 312 and the enhancement encoder 314. In the base encoder 312, the input block is inputted into a low pass filter and downsampler 320. The low pass filter reduces the resolution of the video block which is then fed to the motion estimator 322. The motion estimator 322 processes picture data of each frame as an I-picture, a P-picture, or as a B-picture. Each of the pictures of the sequentially entered frames is processed as one of the I-, P-, or B-pictures in a pre-set manner, such as in the sequence of I, B, P, B, P, . . . , B, P. That is, the motion estimator 322 refers to a pre-set reference frame in a series of pictures stored in a frame memory not illustrated and detects the motion vector of a macro-block, that is, a small block of 16 pixels by 16 lines of the frame being encoded by pattern matching (block Matching) between the macro-block and the reference frame for detecting the motion vector of the macro-block.

In MPEG, there are four picture prediction modes, that is an intra-coding (intra-frame coding), a forward predictive coding, a backward predictive coding, and a bi-directional predictive-coding. An I-picture is an intra-coded picture, a P-picture is an intra-coded or forward predictive coded or backward predictive coded picture, and a B-picture is an intra-coded, a forward predictive coded, or a bidirectional predictive-coded picture.

The motion estimator 322 performs forward prediction on a P-picture to detect its motion vector. Additionally, the motion estimator 322 performs forward prediction, backward prediction, and bi-directional prediction for a B-picture to detect the respective motion vectors. In a known manner, the motion estimator 322 searches, in the frame memory, for a block of pixels which most resembles the current input block of pixels. Various search algorithms are known in the art. They are generally based on evaluating the mean absolute difference (MAD) or the mean square error (MSE) between the pixels of the current input block and those of the candidate block. The candidate block having the least MAD or MSE is then selected to be the motion-compensated prediction block. Its relative location with respect to the location of the current input block is the motion vector.

Upon receiving the prediction mode and the motion vector from the motion estimator 322, the motion compensator 324 may read out encoded and already locally decoded picture data stored in the frame memory in accordance with the prediction mode and the motion vector and may supply the read-out data as a prediction picture to arithmetic unit 325 and switch 344. The arithmetic unit 325 also receives the input block and calculates the difference between the input block and the prediction picture from the motion compensator 324. The difference value is then supplied to the DCT circuit 330.

If only the prediction mode is received from the motion estimator 322, that is, if the prediction mode is the intra-coding mode, the motion compensator 324 may not output a prediction picture. In such a situation, the arithmetic unit 325 may not perform the above-described processing, but instead may directly output the input block to the DCT circuit 330 through switch 338. In such a situation, the I-frames are forwarded to the DCT circuit 330.

The DCT circuit 330 performs DCT processing on the output signal from the arithmetic unit 325 so as to obtain DCT coefficients which are supplied to a quantizer 332. The quantizer 332 sets a quantization step (quantization scale) in accordance with the data storage quantity in a buffer (not illustrated) received as a feedback and quantizes the DCT coefficients from the DCT circuit 330 using the quantization step. The quantized DCT coefficients are supplied to the VLC unit 334 along with the set quantization step.

The VLC unit 334 converts the quantization coefficients supplied from the quantizer 332 into a variable length code, such as a Huffman code, in accordance with the quantization step supplied from the quantizer 332. The resulting converted quantization coefficients are outputted to a buffer not illustrated. The quantization coefficients and the quantization step are also supplied to an inverse quantizer 338 which dequantizes the quantization coefficients in accordance with the quantization step so as to convert the same to DCT coefficients. The DCT coefficients are supplied to the inverse DCT unit 340 which performs inverse DCT on the DCT coefficients. The obtained inverse DCT coefficients are then supplied to the arithmetic unit 348.

The arithmetic unit 348 receives the inverse DCT coefficients from the inverse DCT unit 340 and the data from the motion compensator 324 depending on the location of switch 344. The arithmetic unit 348 sums the signal (prediction residuals) from the inverse DCT unit 340 to the predicted picture from the motion compensator 324 to locally decode the original picture. However, if the predition mode indicates intra-coding, the output of the inverse DCT unit 340 may be directly fed to the frame memory. The decoded picture obtained by the arithmetic unit 340 is sent to and stored in the frame memory so as to be used later as a reference picture for an inter-coded picture, forward predictive coded picture, backward predictive coded picture, or a bi-directional predictive coded picture.

The enhancement encoder 314 comprises a motion estimator 354, a motion compensator 356, a DCT circuit 368, a quantizer 370, a VLC unit 372, a bitrate controller 374, an inverse quantizer 376, an inverse DCT circuit 378, switches 366 and 382, subtractors 358 and 364, and adders 380 and 388. In addition, the enhancement encoder 314 may also include DC-offsets 360 and 384, adder 362 and subtractor 386. The operation of many of these components is similar to the operation of similar components in the base encoder 312 and will not be described in detail.

The output of the arithmetic unit 348 is also supplied to the upsampler 350 which generally reconstructs the filtered out resolution from the decoded video stream and provides a video data stream having substantially the same resolution as the high-resolution input. However, because of the filtering and losses resulting from the compression and decompression, certain errors are present in the reconstructed stream. The errors are determined in the subtraction unit 358 by subtracting the reconstructed high-resolution stream from the original, unmodified high resolution stream.

Figure 1:
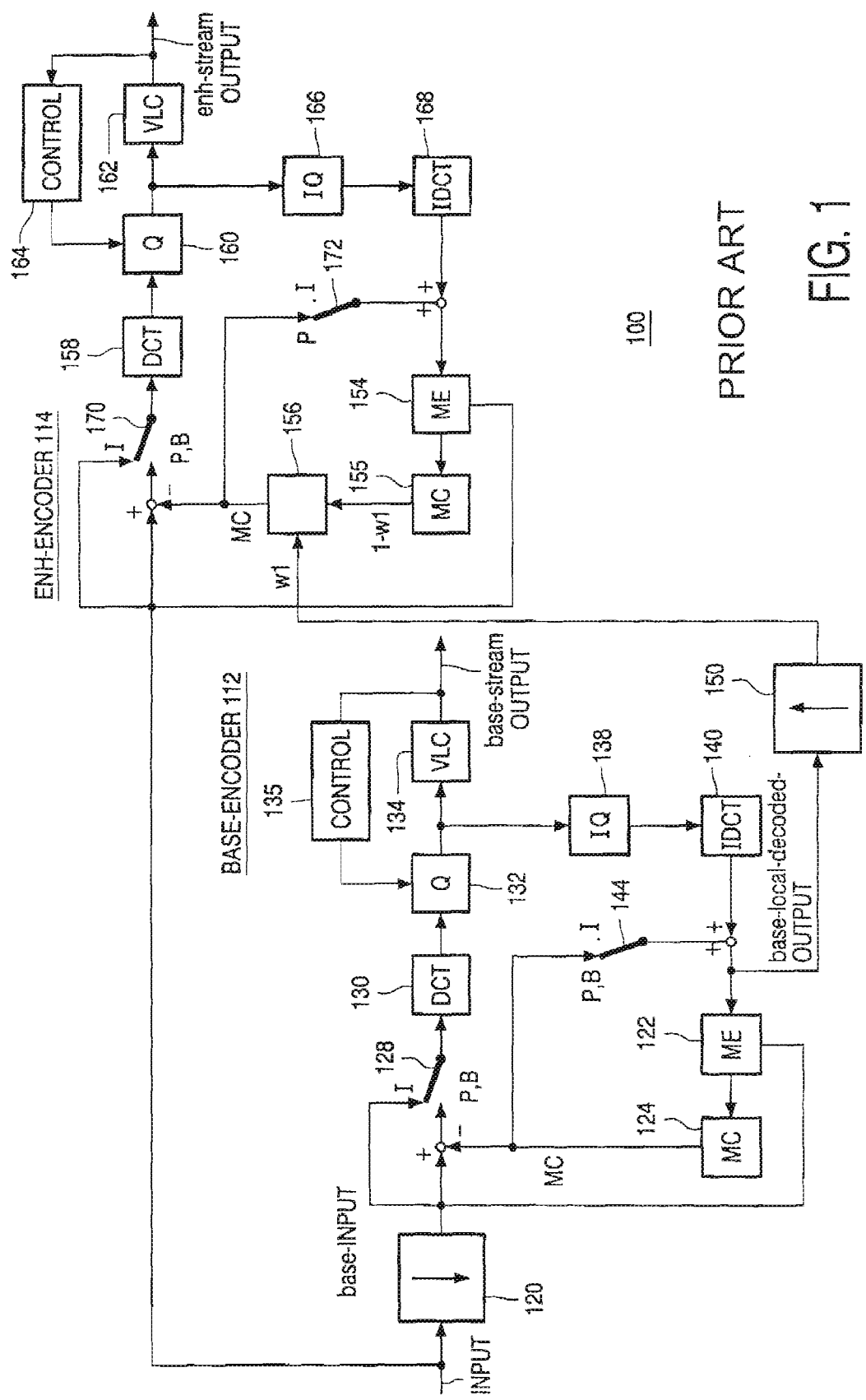
FIG. 1 is a block schematic representation of a known encoder with spatial scalability.
Figure 2:
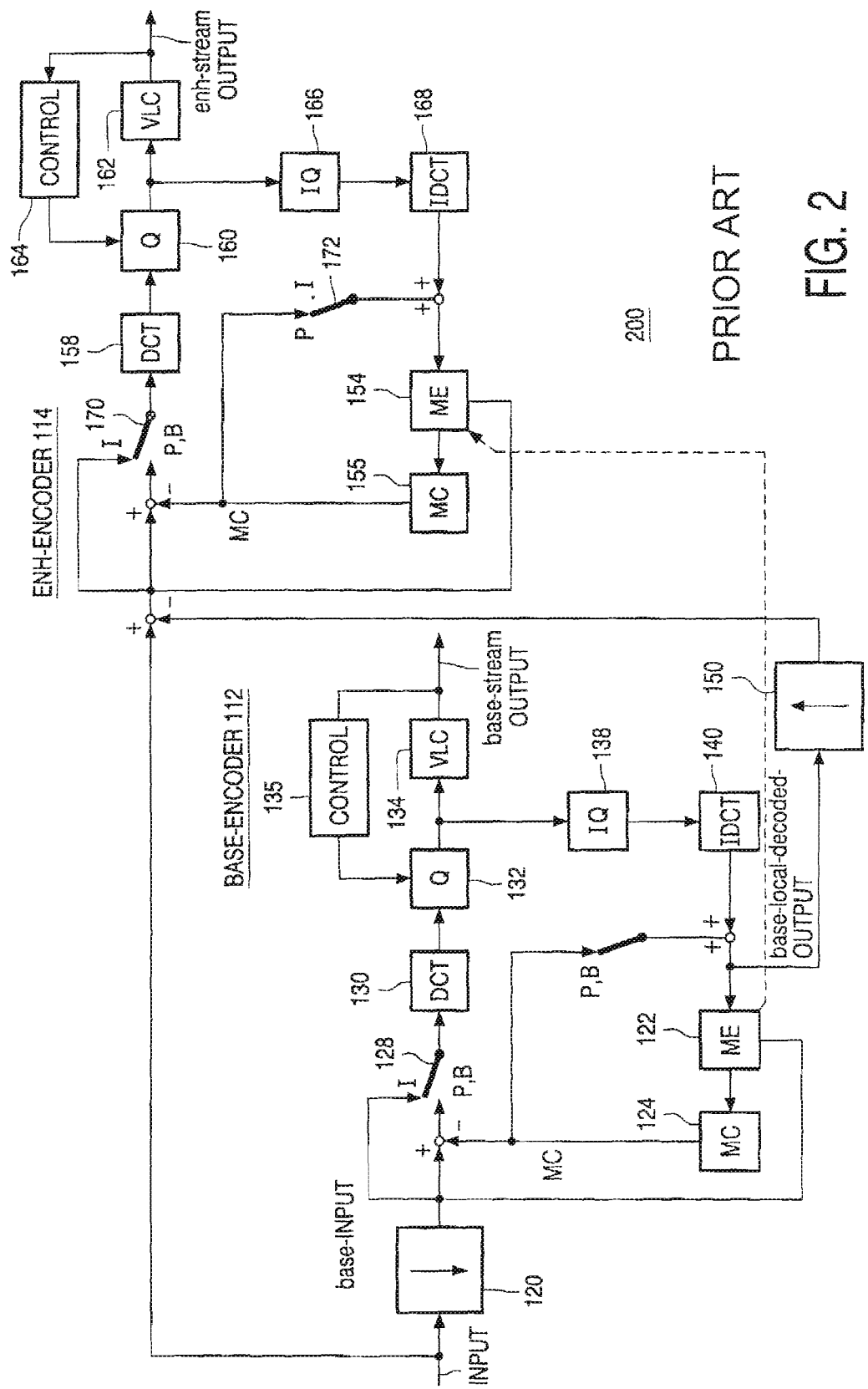
FIG. 2 is a block schematic representation of a known encoder with spatial scalability.

According to one embodiment of the invention illustrated in FIG. 3, the original unmodified high-resolution stream is also provided to the motion estimator 354. The reconstructed high-resolution stream is also provided to an adder 388 which adds the output from the inverse DCT 378 (possibly modified by the output of the motion compensator 356 depending on the position of the switch 382). The output of the adder 388 is supplied to the motion estimator 354. As a result, the motion estimation is performed on the upscaled base layer plus the enhancement layer instead of the residual difference between the original high-resolution stream and the reconstructed high-resolution stream. This motion estimation produces motion vectors that track the actual motion better than the vectors produced by the known systems of FIGS. 1 and 2. This leads to a perceptually better picture quality especially for consumer applications which have lower bit rates than professional applications.

As mentioned above, the size of the enhancement layer can be reduced without much reduction in picture quality, by inserting empty B-frames (muting frame information) into the enhancement encoder. This can be accomplished by using the switch 366. The switch 366 can be positioned so that empty B-frames (no DCT-coefficients) and the motion vectors are supplied to the DCT circuit 368. As a result, the motion vectors are encoded by the enhancement encoder 314.

Figure 4:
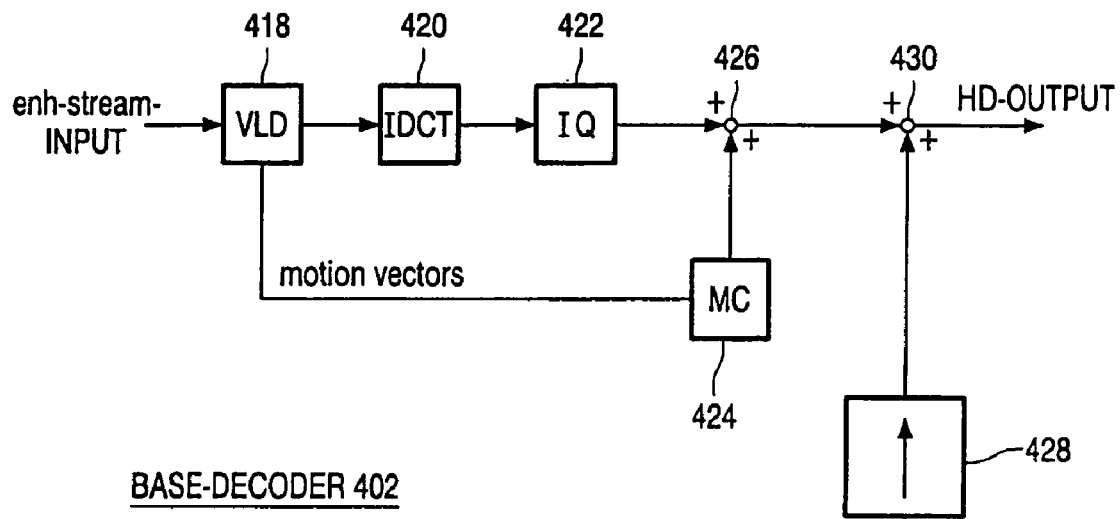
FIG. 4 is a block schematic representation of a layer decoder for decoding a video stream from the encoder illustrated in FIG. 3 according to one embodiment of the invention.
Figure 4:
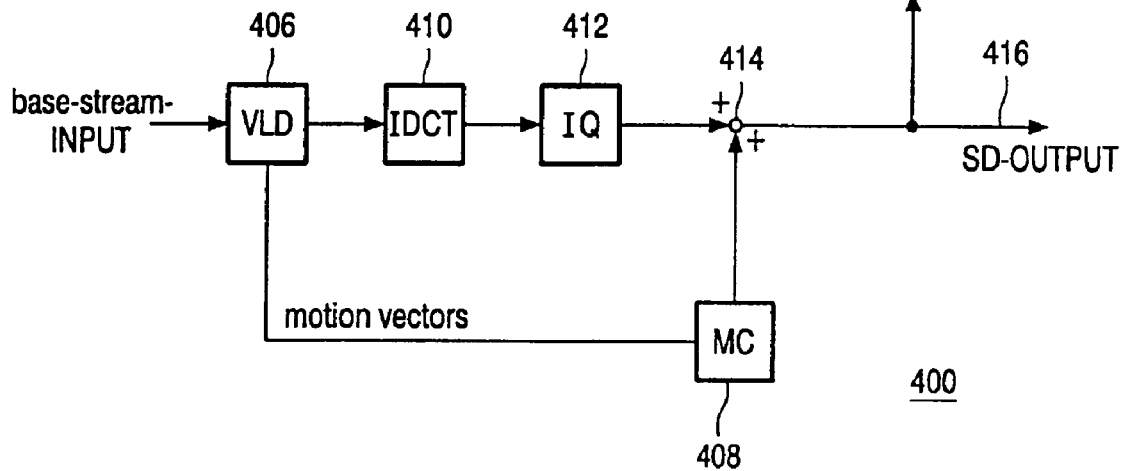

FIG. 4 illustrates a layered decoder 400 for decoding the layered bit stream produced by the encoder 300 illustrated in FIG. 3. It will be understood by those skilled in the art that other layered decoders could also be used and the invention is not limited thereto. The layered decoder 400 has a base decoder 402 and an enhancement decoder 404. The base stream from the base encoder is input into the VLD unit 406.

The VLD unit 406 decodes the base stream and supplies the motion vectors to a motion compensator 408. The rest of the decoded stream is supplied to an inverse DCT unit 410. The inverse DCT unit 410 performs an inverse DCT on the DCT coefficients. The resulting signal is supplied to an inverse quantizer 412. The output of the inverse quantizer 412 and the output of the motion compensator 408 are added together by addition unit 414 to create an SD-output signal 416. The SD-output signal 416 is also fed back to the motion compensator 408.

The enhancement decoder 404 also contains a VLD unit 418, and inverse DCT unit 420, an inverse quantizer 422, a motion compensator 424 and an addition unit 426 which operate in a similar manner as the like elements of the base decoder 402. The enhancement decoder 404 decodes the frames in the encoded enhancement stream, wherein in at least some of the frames the residual signal has been muted while motion information is maintained in these frames. To create a HD-output, the output of the addition unit 426 is added to the decoded SD-output signal 416 which has been upconverted by an upconverting unit 428 in an addition unit 430.

Figure 5:
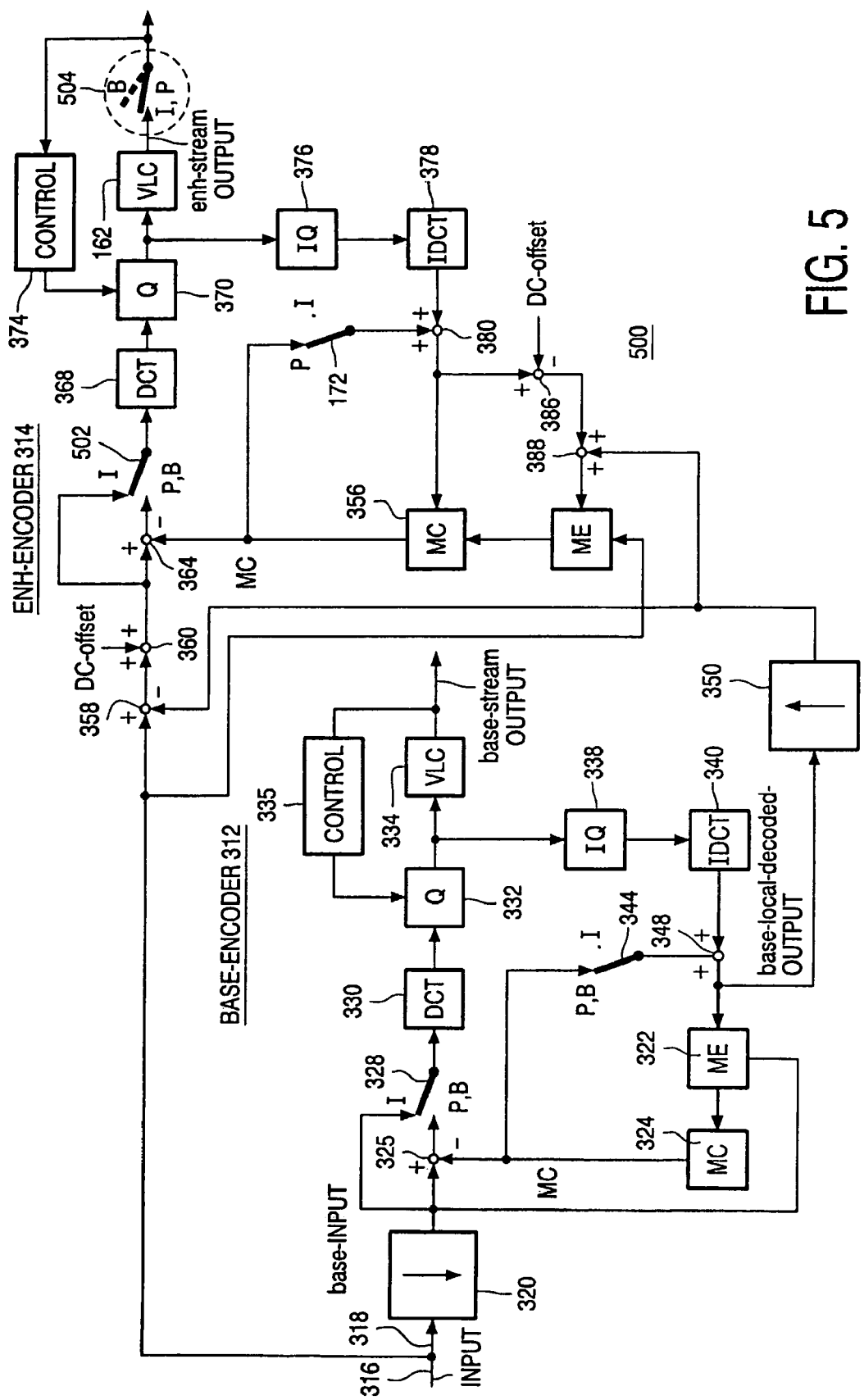
FIG. 5 is a block schematic representation of an encoder with spatial scalability according to another embodiment of the invention.

According to another embodiment of the invention, some frames are encoded and some frames are skipped (muted) in the enhancement layer and a motion compensating algorithm can be used at the decoder to generate the enhancement layer for the skipped frames. FIG. 5 is a schematic diagram of an illustrative encoder 500 which can be used to implement this embodiment of the invention. It will be understood by those skilled in the art that other encoders can also be used to implement the invention. The encoder 500 is similar to the encoder 300 described above with reference to FIG. 3. Like reference numerals have been used for like elements and a full description of these like elements will not be provided for the sake of brevity. The encoder 500 has two switches 502 and 504 which are different from the encoder 300. The switch 502 is positioned to select I-frames or P-, B-frames for encoding by the enhancement encoder 314. The second switch 504 is provided on the output of the enhancement encoder 314. The switch 504 can be moved back and forth so as to select encoded frames or empty frames for transmission. For example, the switch 504 can be moved after each frame is outputted so that every other frame in the encoded enhancement stream is coded and the other frames are skipped (muted). By skipping (muting) frames in the encoded enhancement stream, the size of the enhancement stream can be greatly reduced.

Figure 6:
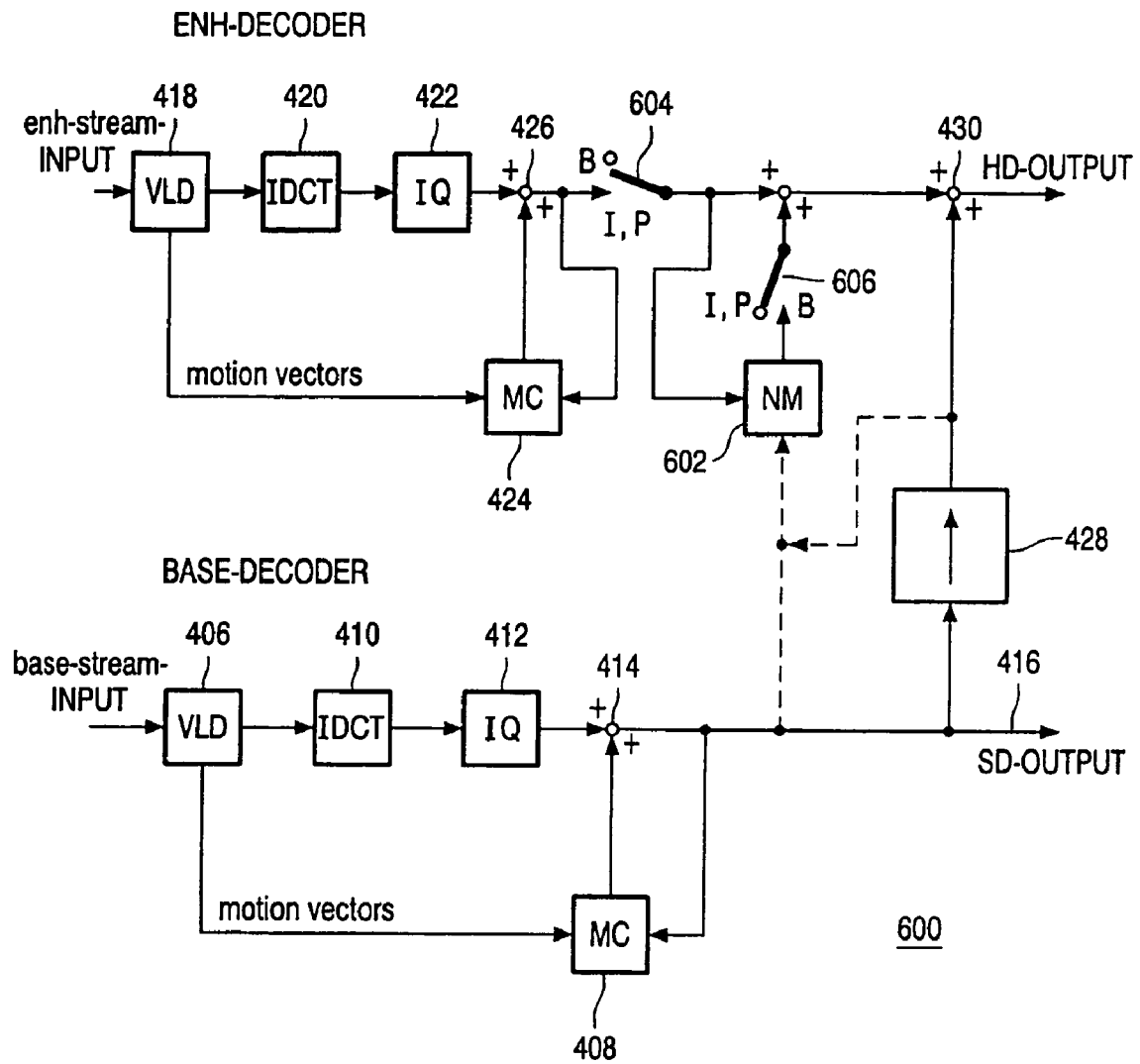
FIG. 6 is a block schematic representation of decoder for decoding a video stream from the encoder illustrated in FIG. 5 according to one embodiment of the invention.

In order to prevent the skipped frames from harming the quality of the resulting picture, a temporal (motion compensated or non motion compensated) interpolation unit 602 is added to the decoder 600 which is illustrated in FIG. 6. The decoder 600 is similar to the decoder 400 and like reference numbers have been used for like elements. In this example, the base decoder 402 decodes the base stream in a known manner. In addition, the enhancement decoder 404 decodes the encoded frames of the enhancement stream in a known manner. The temporal interpolation unit 602 generates an enhancement layer output for the frames which have been skipped by analyzing the decoded enhancement stream from the enhancement decoder 404. In addition, the base layer output 416 can also be used to enhance the motion estimation in the temporal interpolation unit 602. In addition, the upconverted decoded base stream from the upconverter 428 can also be inputted into the temporal interpolation unit 602. The output of the enhancement decoder 404 is interleaved with the output of the temporal interpolation unit 602 by selectively moving switches 604 and 606 back and forth.

The output of the switch 604 can be, for example, the stream IoPoPoP . . . , where o represents the B frames which were muted in the original residual signal. The temporal interpolation unit creates frames B' which are interleaved with the output of switch 604 to create an interleaved stream IB'PB'PB'P . . . . The interleaved stream and the upconverted base stream are combined in addition unit 430 to create the HD-output stream.

The above-described embodiments of the invention enhance the efficiency of spatial scalable compression schemes by lowering the bitrate of the enhancement layer by muting or partially muting some frames over the enhancement layer. It will be understood that the different embodiments of the invention are not limited to the exact order of the above-described steps as the timing of some steps can be interchanged without affecting the overall operation of the invention. Furthermore, the term "comprising" does not exclude other elements or steps, the terms "a" and "an" do not exclude a plurality and a single processor or other unit may fulfill the functions of several of the units or circuits recited in the claims.

The invention claimed is:

1. An apparatus for performing spatial scalable compression of video information captured in a plurality of frames including an encoder for encoding and outputting the captured video frames into a compressed data stream, comprising:
    a base layer encoder for encoding a bitstream having a relatively low resolution, derived from original frames of input video information, to form a base layer;
    an enhancement layer encoder for encoding a residual signal, the residual signal being the difference between the original frames and upscaled frames from the base layer; and
    a muter for muting information in selected frames in said enhancement encoder.

2. The apparatus for performing spatial scalable compression of video information as claimed in claim 1, wherein for selected frames, the muter for muting information mutes the residual signal in the enhancement layer encoder while maintaining motion information for the selected frames.

3. The apparatus for performing spatial scalable compression of video information as claimed in claim 1, wherein the muter for muting information mutes selected complete frames of the encoded residual signal.

4. The apparatus for performing spatial scalable compression of video information as claimed in claim 1, wherein the muter for muting information mutes frame information at regular intervals.

5. The apparatus for performing spatial scalable compression of video information as claimed in claim 4, wherein the interval length is 2 frames.

6. A layered encoder for encoding an input video stream, comprising:
    a downsampling unit for reducing a resolution of the input video stream thereby forming a reduced resolution video stream;
    a base encoder for encoding the reduced resolution video stream to form a lower resolution base stream;
    an upconverting unit for decoding and increasing a resolution of the lower resolution base stream to produce a reconstructed video stream;
    a subtractor unit for subtracting the reconstructed video stream from the input video stream to produce a residual signal;
    an enhancement encoder for encoding the resulting residual signal from the subtractor unit and outputting an enhancement stream; and
    a muter for muting information in selected frames in the enhancement encoder.

7. The layered encoder as claimed in claim 6, wherein for selected frames, the muter for muting information mutes the residual signal in the enhancement encoder while maintaining motion information for the selected frames.

8. The layered encoder as claimed in claim 6, wherein the muter for muting information mutes selected complete frames of the encoded residual signal.

9. The layered encoder as claimed in claim 6, wherein the muter for muting information mutes frame information at regular intervals.

10. The layered encoder as claimed in claim 9, wherein the interval length is 2 frames.

11. A method for providing spatial scalable compression using adaptive content filtering of an input video stream, the method comprising the steps of:
    downsampling the input video stream to reduce the resolution of the video stream;
    encoding the downsampled video stream to produce a base stream;
    decoding and upconverting the base stream to produce a reconstructed video stream;
    subtracting the reconstructed video stream from the input video stream to produce a residual stream;
    encoding the residual stream in an enhancement encoder and outputting an enhancement stream; and
    muting information in selected frames in said enhancement encoder.

12. A layered decoder for decoding compressed video information, the layered decoder comprising:
    a base stream decoder for decoding a received base stream in the compressed video information;
    an upconverting unit for increasing the resolution of the of the decoded base stream;
    an enhancement stream decoder for decoding frames in a received encoded enhancement stream in the compressed video information to create a first decoded enhancement stream, wherein selected frames only contain motion information; and
    an addition unit for combining the upconverted decoded base stream and the first decoded enhancement stream to produce a video output.

13. The layered decoder as claimed in claim 12, wherein said layered decoder further comprises:
    a temporal interpolation unit for generating a second decoded enhancement stream for the selected frames in the received enhancement stream; and
    an interleaver for interleaving the first and second decoded enhancement streams into an interleaved enhancement stream.

14. The layered decoder as claimed in claim 13, wherein non-selected decoded frames are provided to the temporal interpolation unit.

15. The layered decoder as claimed in claim 13, wherein the decoded base stream is provided to the temporal interpolation unit.

16. The layered decoder as claimed in claim 13, wherein the upconverted decoded base stream is provided to the temporal interpolation unit.

17. A method for decoding compressed video information received in a base stream and an enhancement stream, the method comprising the steps of:

decoding the base stream;

upconverting the decoded base stream to increase a resolution of the decoded base stream;

decoding frames in the enhancement stream to create a first decoded enhancement stream, wherein selected frames only contain motion information; and combining the upconverted decoded base stream with the first decoded enhancement stream to produce a video output.

18. The method as claimed in claim 17, wherein said method further comprises the steps of:

generating a second decoded enhancement stream for the selected frames in the received enhancement stream using a temporal interpolation algorithm; and interleaving the first and second decoded enhancement streams to create an interleaved enhancement stream, and wherein said combining step combines the upconverted decoded base stream with the interleaved enhancement stream to produce the video signal.

19. The method as claimed in claim 18, wherein temporal interpolation is performed by a natural motion algorithm.

* * * * *